Nov. 13, 1934.  W. L. WRIGHT  1,980,463
FILM HANDLING MECHANISM
Filed May 31, 1930  2 Sheets-Sheet 1
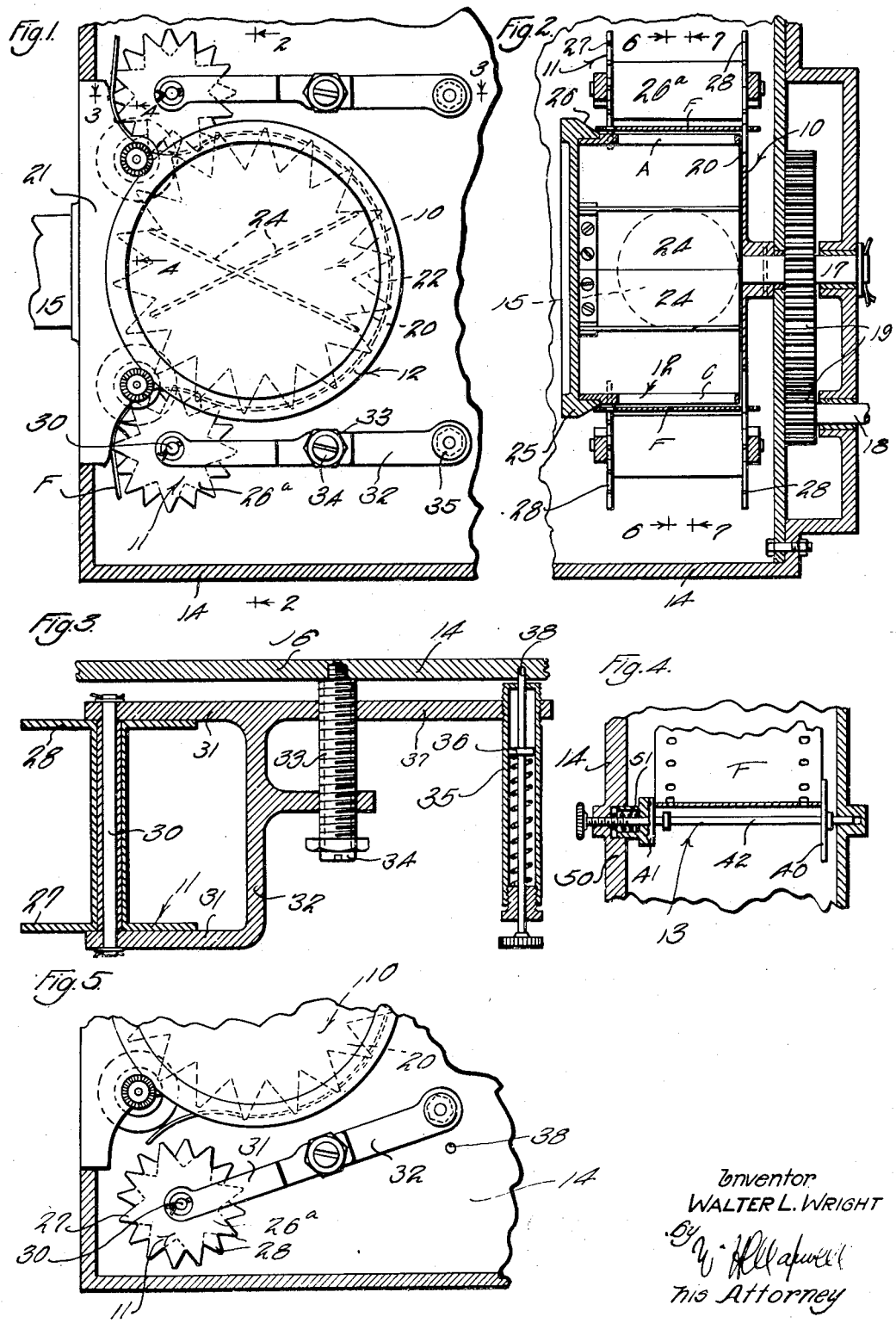
Inventor
WALTER L. WRIGHT
By
His Attorney Nov. 13, 1934.   W. L. WRIGHT   1,980,463
FILM HANDLING MECHANISM
Filed May 31, 1930   2 Sheets-Sheet 2
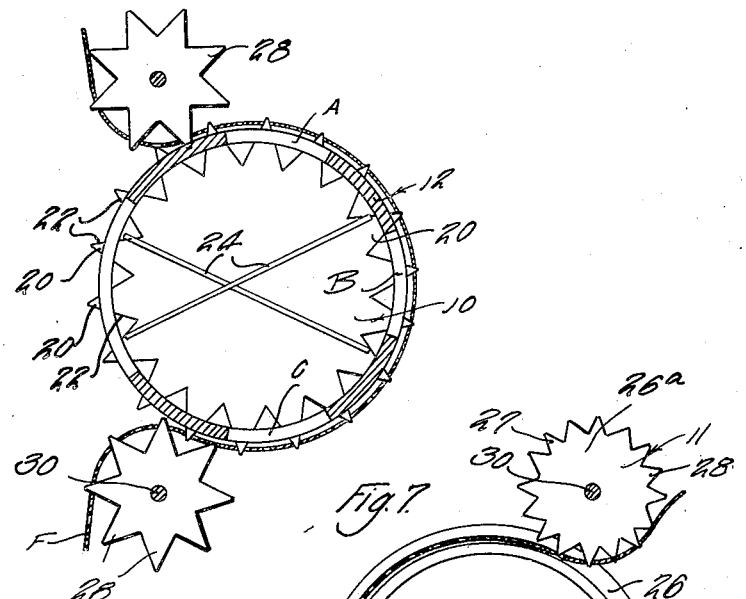
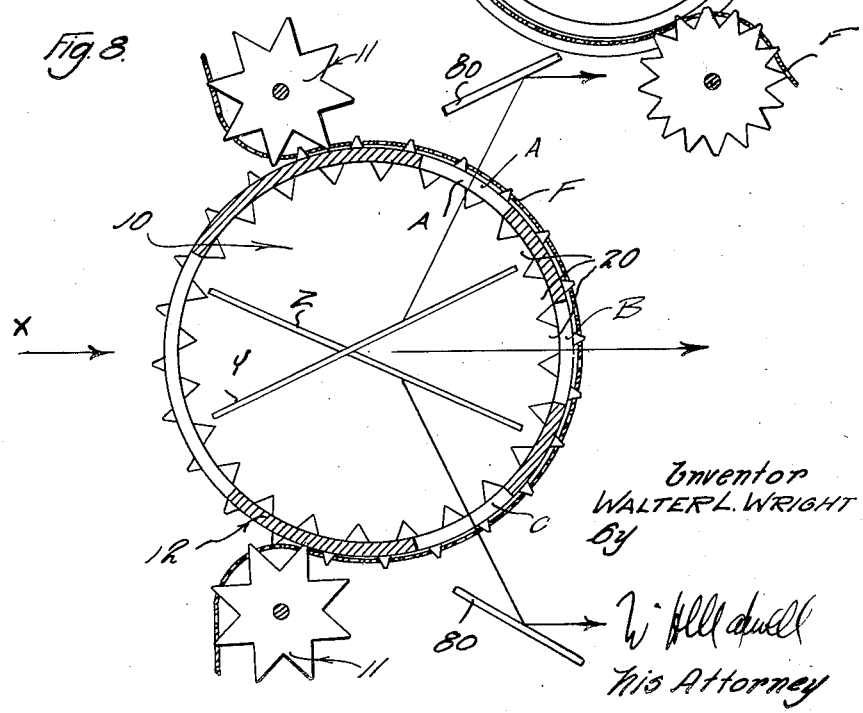
Inventor
WALTER L. WRIGHT
by
W. Caldwell
his Attorney

UNITED STATES PATENT OFFICE 1,980,463

FILM-HANDLING MECHANISM

Walter L. Wright, Santa Monica, Calif., assignor to Synchrome Corporation, Los Angeles County, Calif., a corporation of California Application May 31, 1930, Serial No. 458,429

11 Claims. (Cl. 271—2.4)

This invention has to do with a mechanism for handling motion picture film and it is a general object of the invention to provide a mechanism for handling film smoothly, accurately, and in a manner to compensate for variation in the length of the film due to shrinkage or expansion.

It is desirable in certain phases of motion picture production to expose or project several images on a film simultaneously, this being particularly true in the case of color photography. In practice a very serious difficulty is encountered when attempting to utilize a substantial length of film in this way. Shrinkage and expansion of the film causes considerable variation between the end portions of a series of pictures or exposures on a film making it impractical, if not impossible, to obtain satisfactory results with the usual film-handling mechanisms. It is particularly desirable for various reasons to space the several pictures of a series, taken simultaneously, apart along the film, in fact, it is desirable to space them apart so that pictures of adjoining series occupy the spaces between adjacent pictures of each series, thus obtaining suitable spacing of the pictures of a series without waste of film area. It is obviously simple to register or definitely position any one point along a film or any one picture of a series; however, when there are several pictures of a series distributed along a substantial length of film there is considerable variation between the end pictures of the series due to shrinkage or expansion of the film, and it therefore becomes extremely difficult to definitely position the several pictures of a series for the purpose of projection.

It is a primary object of the present invention to provide a film-handling mechanism which handles film in a manner to effectively overcome changes or variations in the length of the film due to shrinkage or expansion, the mechanism being suited for various classes of motion picture apparatus, for instance, for use in cameras, projectors, printers, etc.

It is another object of this invention to provide a film-handling mechanism which holds the film curved about a definite point or center and engages the film at longitudinally spaced points to definitely and positively position the film at such points. With the mechanism provided by this invention the film, being held in a curved position and having longitudinally spaced points definitely positioned, has any variation due to shrinkage or expansion distributed around the curved portion between the two fixed points so that it does not in practice in any way interfere with the production of pictures.

It is a further object of this invention to provide a film-handling mechanism, having a main sprocket around which a substantial length of film is arranged, and means engaging the film at the points where it passes onto and off of the sprocket allowing the portion of film between said points to assume a natural curved position.

A further object of the invention is to provide an improved form of film engaging sprocket. By the present invention I provide a sprocket around which a length of film may be arranged, which sprocket has teeth so related as to allow the film to readily and accurately accommodate itself to the sprocket. In the preferred form of the invention the teeth of the sprocket are related to engage every other perforation of the film allowing film that has shrunk to flatten slightly between adjoining teeth, thus compensating for the shrinkage without putting the film under undue strain or causing it to tend to ride off of the sprocket.

It is a further object of this invention to provide in combination two sprockets each having teeth spaced to engage every other perforation on the film, the sprockets being related to engage the film so that every perforation of the film is engaged as the film passes between the sprockets.

It is another object of this invention to provide a mechanism of the character just mentioned in which the sprockets are related so that their teeth engage the perforations of the film to positively hold the film in position in both directions longitudinally.

It is a further object of this invention to provide a film-handling mechanism of the character mentioned in which the film is definitely guided laterally or against side movement as well as being guided and held longitudinally. It is a feature of the invention that the means for guiding the film sideways is mounted in a solid or rigid part of the apparatus, making it particularly accurate.

It is another object of this invention to provide a film-handling mechanism of the general character mentioned which operates to hold or carry a film so that it can be operated with equal accuracy and freedom in either direction.

It is a further and general object of the present invention to provide a film-handling mechanism which effectively and accurately handles a film in a manner suitable for use in a camera or projector without the use of a film-carrying track, spring-pressed film-engaging shoes or clamps, or other friction means such as ordinarily characterize film-handling mechanisms.

The various objects and features of my invention will be best and more fully understood from the following detailed description of typical preferred forms and applications of the invention, throughout which description reference is had to the accompanying drawings, in which:

Fig. 1 is a sectional view of a camera showing an end elevation of the film-handling mechanism of the camera, which mechanism embodies the present invention. Fig. 2 is a sectional view of the mechanism taken as indicated by line 2—2 on Fig. 1. Fig. 3 is an enlarged detailed plan section taken as indicated by line 3—3 on Fig. 1. Fig. 4 is a detailed transverse sectional view taken as indicated by line 4—4 on Fig. 1. Fig. 5 is a view similar to a portion of Fig. 1 showing one of the film guide sprockets released to allow film to pass between it and the main sprocket. Fig. 6 is a detailed transverse sectional view taken as indicated by line 6—6 on Fig. 2. Fig. 7 is a view similar to Fig. 6 taken in the opposite direction, being a view taken as indicated by line 7—7 on Fig. 2, and Fig. 8 is a view similar to Fig. 6 showing the mechanism in combination with an optical system of a projector.

The mechanism provided by this invention is applicable, generally, to handling motion-picture film. The mechanism may be used to advantage in various types of motion-picture apparatus, for instance, in cameras, projectors, printers, etc. Further, the mechanism may be designed to handle film of various sizes, that is, film of standard motion-picture size or films that are smaller or larger than standard. For purpose of example I will proceed with a detailed description of a form of the invention particularly suited for use in a camera or projector and designed to handle film in which each series of pictures is composed of three pictures in which adjoining pictures are spaced apart a distance equal to one picture and in which the spaces between pictures are occupied by end pictures of adjoining series of pictures.

The mechanism includes, generally, a main sprocket 10 which supports and advances the film, means 11 for positioning the film on the main sprocket, an aperture plate 12 about which the film is supported and operated by the main sprocket, means 13 for guiding the film transversely or sideways, and various other parts the details and functions of which will be hereinafter described.

In Figs. 1 to 7, inclusive, of the drawings the invention is shown applied to a camera including a case 14 having a lens device 15 at its front to admit light and having a wall or partition on which the film-handling mechanism is mounted so that it is in the proper position with reference to the lens device.

The main sprocket 10 is arranged in the case 14 on a shaft 17 adapted to be intermittently operated from a suitable movement mechanism (not shown). In the drawings I have shown the shaft 18 of a movement mechanism operatively connected with the shaft 17 through gears 19 but I have not shown the complete movement mechanism as such devices are familiar to those skilled in the art and as this element has no direct part in the present invention.

The sprocket 10 is shown in the form of a flat disk provided at its periphery with a series of teeth 20. In accordance with the present invention the teeth 20 of the sprocket are spaced apart to engage spaced perforations on the film, preferably every other perforation. The film F is adapted to seat fully on the teeth 20 of the sprocket 10 at one or more points, and therefore I design the teeth so that they will allow the film to seat on them to be held against longitudinal movement in either direction relative to the sprocket. In the particular form of the invention illustrated the teeth have straight outwardly convergent sides or faces adapted to engage opposite walls of the film perforations. These pointed teeth are proportioned so that they will readily enter the perforations and allow the film to pass inwardly on them until it seats on both faces 22 simultaneously. This form of sprocket is materially different from the ordinary film sprocket as it engages the film at longitudinal points spaced a substantial distance apart, that is, it engages the film at every other perforation, while the usual film sprocket engages the film at every perforation. Further, the form of tooth provided by this invention is distinctly different from the ordinary film sprocket tooth in that the present tooth engages the film to hold it in both directions longitudinally whereas the ordinary tooth fits the film perforation to engage only one wall or edge of the perforation at a time.

The aperture plate 12 follows the contour of the peripheral portion of the sprocket, in fact, it may be curved concentrically with the sprocket. The aperture plate 12 is preferably mounted stationary in the case 14 through a flange-like extension 21 which attaches to the front of the case. A series of apertures A, B, and C are provided in the aperture plate 12 to register with the film carried by the main sprocket. In the particular case illustrated the three adjoining apertures of the plate are spaced apart one picture area so that the mechanism will accommodate the type of film hereinabove referred to. For purpose of example I have illustrated crossed light dividers 24 within the aperture plate to receive light from the lens device 15 and direct it through the apertures A, B, and C so that it will fall on the film F. Where the main sprocket 10 is in the form of a single disk having a single series of teeth 20 as shown in the drawings, it is desirable to provide a film support or guide for the marginal portion of the film opposite that engaged by the main sprocket. In the form of the invention illustrated I provide a film guide 25 on the aperture plate for this purpose. The film guide has an inclined or beveled film engaging face 26 along which the edge of the film may slide.

In accordance with the preferred form of the invention the means 11 provided for positioning the film on the main sprocket engages the film at the two ends of the series of apertures in the plate 12. In the form of the invention illustrated the means 11 includes sprockets 26ª engaging the film F where it enters or passes onto the main sprocket 10 and where it leaves or passes off of the main sprocket. Each of the sprockets 26ª has a series of film-engaging teeth 28 adapted to cooperate with the teeth 20 of the main sprocket to definitely and positively position the film longitudinally with reference to the sprocket. The teeth 28 are spaced apart to engage perforations of the film between those engaged by the teeth of the main sprocket. In the form of the invention illustrated the teeth 28 are shown spaced apart and engaging every other film perforation, and are related to the teeth of the main sprocket to operate between the teeth of the main sprocket, thus engaging the perforations of the film not engaged by the teeth of the main sprocket. The sprockets 26ᵃ are positioned with reference to the main sprocket so that the teeth 28, which are preferably designed to correspond with those of the main sprocket, enter the film perforations to carry the film onto the teeth of the main sprocket so that the portion of the film between the main sprocket and one of the sprockets 26ᵃ is definitely and positively seated on the teeth of the main sprocket as well as on at least one tooth of the guide sprocket, with the result that the film is positively held against longitudinal movement at this point. The fact that the teeth of the two sprockets engage the film at different apertures or perforations allows for this definite and positive holding of the film by means of the main sprocket and guide sprocket alone. In the preferred form of the invention each sprocket 26ᵃ is provided with a series of teeth 27 to engage the series of perforations at the other margin of the film. The teeth 27 of the guide sprocket may be such as to engage every perforation of the film in that these teeth do not have to mesh with or fit between teeth of the main sprocket as do the teeth 28. I have found that by thus engaging the other margin of the film by means of teeth 27 fitting each perforation of the film, the film is accurately and properly guided or fed with reference to the sprockets 26.

In practice the sprockets 26ᵃ may be mounted to facilitate handling of the film; for instance, feeding of the film into the mechanism. In the form of the invention shown each sprocket is carried on a shaft 30 arranged between arms 31 of a bracket 32. The bracket 32 has an adjustable sleeve 33 which fits or rotates on a stud 34 projecting from the partition 16 of the case 14. The sleeve 33 is screw threaded to the bracket 32 so that it can be adjusted in the bracket to vary the spacing of the sprocket 26 from the partition 16, thus making it possible to accurately align the sprocket 26ᵃ with the main sprocket 10. A releasable locking device 35 is provided for setting the bracket against rotation about the stud 34 when it is in operating position with reference to the main sprocket. The locking device illustrated includes a spring-pressed plunger 36 carried by an extension 37 of the bracket adapted to engage a socket 38 provided in the partition 16. In practice I have found it desirable to form the guide sprockets 26ᵃ of non-metallic material such as fibre, or the like, to avoid undesirable noise such as may be caused by the teeth of the guide sprockets engaging those of the main sprocket when there is no film in the mechanism.

The means 13 for guiding the film sideways operates to definitely position the film sideways, for instance, with reference to the guide 25. In the drawings I have shown a side guide at or adjacent each guide sprocket 26ᵃ. Each side guide includes two spaced disks 40 and 41 on a shaft 42, the disks being adapted to engage the two edges of the film at a point as close as possible to that at which the film is engaged by the main sprocket and guide sprocket. The disk 40 is adjustable through adjustment of the shaft 42 which supports it, the shaft being screw threaded to a frame part 50 so that it can be adjusted. The disk 41 is free to move longitudinally on the shaft and may be urged by means of a spring 51 into engagement with the edge of the film, causing the film to be held between the disks in the manner clearly illustrated in Fig. 4. In the particular case shown the disks 40 and 41 are free to rotate on the shaft.

From the foregoing description it will be apparent how the film F is supported and advanced by the main sprocket being definitely and positively positioned at two spaced points on the main sprocket, these points being where it is engaged by the guide sprockets 26ᵃ. The portion or loop of the film extending around the main sprocket between the guide sprockets may ride more or less freely on the teeth, in fact, it may lift off the teeth if the film is stretched excessively, and it may seat on the teeth all the way around the main sprocket in the event that it is shrunk excessively. In the latter case the free parts of the film between the teeth of the main sprocket allow for engagement of the film entirely around the sprocket in the manner stated. Ordinarily, however, the shrinkage or expansion of the film is not sufficient to cause extreme conditions but is such as to allow the film to barely free the teeth of the main sprocket at a point midway between the points where the film is engaged by the guide sprockets. The guide sprockets 26ᵃ and the side guide means 13 may be adjusted so that the film F is slidably supported by the guide 25 at the points where the film is engaged by the guide sprockets. The film may continue a substantial distance around the guide 25 in engagement with it or it may bow or lift off of the guide between the points where it is positively held by the sprocket 26ᵃ cooperating with the main sprocket 10. It will be apparent that the film between the points where it is positively held by the guide sprockets cooperating with the main sprocket takes a natural bend or loop which in practice will vary only slightly in compensating for variations in length of film due to shrinkage or expansion. By engaging and positively positioning the film at the two guide sprockets 26ᵃ the end pictures of the series are positively and accurately positioned, while any variations in length of the film is divided between the sprockets 26ᵃ so that there may be a very slight, in fact, a negligible variation in the loop of the film, but allows accurate positioning of the center picture longitudinally of the series.

In Fig. 8 of the drawings I illustrate the mechanism provided by this invention in combination with an optical system suitable for a projector. In this case light is projected in the direction indicated by the arrow X to fall on crossed light dividers Y and Z which direct it through the apertures A and C, allowing part of the light to pass directly through the aperture B. The light projected through the apertures A and C falls on reflectors 80 which direct it onto a screen in register with the light passed through the aperture B.

Having described only typical preferred forms of my invention, I do not wish to limit myself to the specific details set forth, but wish to reserve to myself any changes or variations that may appear to those skilled in the art or fall within the scope of the following claims:

Having described my invention, I claim:

1. A mechanism for handling a film perforated at its margins including, a main sprocket having teeth spaced to engage every other perforation of the film, the faces of the teeth being outwardly convergent allowing the teeth to enter the perforations of the film so that the film is supported on the teeth.

2. A mechanism for handling a film perforated at its margins including, a main sprocket having teeth projections engaging perforations at one margin of the film to support the film and spaced to engage every other perforation at said margin of the film, and a sprocket engaging the film to hold it on the main sprocket, the sprockets being related so that their teeth bear against opposite end walls of the perforations in the film to support the film and hold it against longitudinal movement in either direction.

3. A mechanism for handling a film perforated at its margins including, a main sprocket having teeth to engage perforations at one margin of the film to form the sole support for said margin of the film, the teeth being spaced apart distances greater than the spacing of adjoining perforations of the film, said distances being equal to an even multiple of the spacing of the adjoining perforations, and a member positioning the film on the main sprocket, the teeth of the sprocket having outwardly convergent sides on which the film bears for support.

4. A mechanism for handling a film perforated at its margins including, a main sprocket having teeth to engage perforations at one margin of the film to form the sole support for said margin of the film, the teeth being spaced apart distances greater than the spacing of adjoining perforations of the film, and a sprocket engaging the film between the points of engagement of the teeth of the main sprocket, the teeth of the sprockets having outwardly convergent faces engaging the walls of the film perforations.

5. A film handling mechanism including, a main sprocket having teeth engaging alternate perforations at one margin of the film, and a film retaining sprocket holding the film on the main sprocket, the retaining sprocket having teeth engaging the film at both margins, the teeth at the other margin engaging each perforation as the film passes the sprocket.

6. A film handling mechanism including, a main sprocket having teeth engaging alternate perforations at one margin of the film, and retaining sprockets spaced around the main sprocket holding the film on the main sprocket and engaging perforations at both margins of the film, the teeth of the retaining sprockets engaging each perforation of the film at the other margin of the film.

7. A mechanism for handling a film perforated at its edges including a sprocket having tapered teeth cooperating with alternate perforations in the film, the teeth cooperating with the perforations to hold the film spaced from all other parts of the sprocket and to prevent longitudinal slippage of the film in either direction relative to the sprocket, and a member positioning the film to cooperate with the teeth.

8. A mechanism for handling a film perforated at its margins including, a main sprocket having teeth projections engaging the perforations at one margin of the film and supporting the said margin of the film, the spacing of the projections being equal to a whole multiple of the spacing of the perforations of the film, and spaced sprockets engaging the film to hold it on the main sprocket, the sprockets having teeth to bear in the perforations of the film and being related so that their teeth bear against the opposite end walls of both margins of the perforations in the film to support the film and engaging in every perforation at the other margin as the film passes the sprockets, the sprockets holding the film against longitudinal slippage in either direction.

9. A mechanism for handling a film perforated at its margins including a main sprocket, spaced teeth on the sprocket having outwardly convergent sides cooperating with perforations at one margin of the film to support the said margin of the film on the sprocket against inward movement relative to the central axis of the sprocket, the teeth being spaced apart distances greater than the spacing of the adjoining perforations of the film, said distances being equal to whole multiples of the spacing of the perforations of the film, and a member maintaining the film in cooperation with the said teeth.

10. A mechanism for handling a film perforated at its margins including a main sprocket, teeth on the sprocket cooperating with perforations at one margin of the film, the teeth having convergent sides bearing on the end walls of the perforations to support the said margin of the film on the sprocket, the teeth being spaced apart distances greater than the spacing of the adjoining perforations of the film, said distances being equal to whole multiples of the spacing of the perforations of the film, and means maintaining the film in cooperation with said teeth of the main sprocket, said means including sprockets engaging the film at points spaced around the main sprocket.

11. A mechanism for handling a film perforated at its margins including a main sprocket having projections cooperating with perforations at one margin of the film adapted to support the said margin of the film on the sprocket, the projections being spaced apart distances greater than the spacing of the adjoining perforations of the film, said distances being equal to whole multiples of the spacing of the perforations of the film, and means maintaining the film in cooperation with said projections of the main sprocket, said means including sprockets engaging the film at points spaced around the main sprocket, the last mentioned sprockets having teeth engaging the said margin of the film at points spaced between the points of engagement of the projections with the film and having teeth cooperating with every perforation in the other margin as the film passes the sprockets.

WALTER L. WRIGHT.